United States Patent
Hilton

(10) Patent No.: US 7,282,823 B2
(45) Date of Patent: Oct. 16, 2007

(54) SELF-COOLING ELECTRIC MACHINE

(75) Inventor: Daniel E Hilton, St. Louis, MO (US)

(73) Assignee: Emerson Electric Co., St. Louis, MO (US)

( * ) Notice: Subject to any disclaimer, the term of this patent is extended or adjusted under 35 U.S.C. 154(b) by 258 days.

(21) Appl. No.: 10/977,183

(22) Filed: Oct. 29, 2004

(65) Prior Publication Data

US 2006/0091744 A1    May 4, 2006

(51) Int. Cl.
  *H02K 1/30*    (2006.01)
  *H02K 9/06*    (2006.01)

(52) U.S. Cl. .................. 310/62; 416/244 R; 310/58; 310/67 R; 310/261

(58) Field of Classification Search ............... 310/153, 310/156.26
  See application file for complete search history.

(56) References Cited

U.S. PATENT DOCUMENTS

| | | | |
|---|---|---|---|
| 3,385,516 A * | 5/1968 | Omohundro | 416/93 R |
| 3,829,722 A * | 8/1974 | Rosenthal et al. | 310/50 |
| 3,860,843 A | 1/1975 | Kawasaki et al. | |
| 4,250,417 A | 2/1981 | Arnold | 310/62 |
| 4,431,931 A | 2/1984 | Perrier et al. | |
| 4,451,749 A * | 5/1984 | Kanayama et al. | 310/62 |
| 4,689,507 A | 8/1987 | Baker et al. | 310/62 |
| 4,813,248 A | 3/1989 | Smith et al. | |
| 4,853,571 A | 8/1989 | Smith et al. | |
| 4,904,891 A | 2/1990 | Baker et al. | 310/62 |
| 5,040,285 A | 8/1991 | Williams et al. | |
| 5,266,855 A | 11/1993 | Smith et al. | |
| 5,353,613 A | 10/1994 | Smith et al. | |
| 5,438,228 A | 8/1995 | Couture et al. | 310/67 |
| 5,453,650 A | 9/1995 | Hashimoto et al. | |
| 5,616,975 A | 4/1997 | May et al. | 310/89 |
| 5,737,944 A | 4/1998 | Nishimura et al. | |
| 5,825,108 A | 10/1998 | De Filippis | |
| 5,862,686 A | 1/1999 | Skrippek | |
| 5,982,063 A | 11/1999 | Lutz et al. | 310/77 |
| 5,996,379 A | 12/1999 | Skrippek | |
| 6,011,331 A | 1/2000 | Gierer et al. | 310/58 |
| 6,013,966 A * | 1/2000 | Fehrenbacher et al. | 310/257 |
| 6,049,930 A | 4/2000 | Hisano et al. | |
| 6,148,647 A | 11/2000 | Kabeya et al. | |
| 6,181,047 B1 | 1/2001 | Nitta | |
| 6,205,644 B1 | 3/2001 | Daniels et al. | 29/596 |
| 6,268,677 B1 | 7/2001 | Takabatake et al. | 310/156.5 |
| 6,274,960 B1 | 8/2001 | Sakai et al. | 310/156 |
| 6,396,177 B1 * | 5/2002 | Shin et al. | 310/63 |

(Continued)

FOREIGN PATENT DOCUMENTS

DE    195 17 689 A1    11/1996

(Continued)

OTHER PUBLICATIONS

Synchronous Motor Characteristics, Sheets 1-5, Copyright 2004 Kilowatt Classroom, LLC.

*Primary Examiner*—Burton Mullins
(74) *Attorney, Agent, or Firm*—Harness, Dickey & Pierce, P.L.C.

(57) ABSTRACT

An electric machine having a rotor with a ventilation port and a rotor coupling with at least one air disturber.

15 Claims, 5 Drawing Sheets

U.S. PATENT DOCUMENTS

| | | |
|---|---|---|
| 6,396,190 B1 | 5/2002 | Ahn et al. |
| 6,429,564 B1 * | 8/2002 | Uemura et al. ............. 310/153 |
| 6,460,382 B1 | 10/2002 | Kim et al. |
| 6,510,716 B1 * | 1/2003 | Kim et al. ..................... 68/24 |
| 6,514,052 B2 | 2/2003 | Bostwick .................... 417/366 |
| 6,568,193 B1 | 5/2003 | Cahill .......................... 62/3.2 |
| 6,744,157 B2 | 6/2004 | Choi et al. |
| 6,914,363 B2 | 7/2005 | Kim et al. |
| 6,926,498 B2 * | 8/2005 | Li et al. ....................... 416/3 |
| 7,078,841 B2 * | 7/2006 | Yokota ...................... 310/153 |
| 7,138,741 B2 | 11/2006 | Lee |
| RE039,416 E | 12/2006 | Shin et al. |
| 2002/0053838 A1 | 5/2002 | Kazuma |
| 2004/0163428 A1 | 8/2004 | Kim et al. |
| 2004/0164628 A1 | 8/2004 | Makoto et al. |
| 2005/0146235 A1 | 7/2005 | Kim et al. |
| 2005/0189837 A1 | 9/2005 | Lee |
| 2005/0189838 A1 | 9/2005 | Lee |
| 2005/0194860 A1 | 9/2005 | Lee |
| 2006/0261698 A1 | 11/2006 | Lee |

FOREIGN PATENT DOCUMENTS

| | | | |
|---|---|---|---|
| EP | 0 291 295 A | | 11/1988 |
| EP | 488961 A1 | * | 6/1992 |
| EP | 1 018 795 A | | 7/2000 |
| FR | 2 536 222 | | 5/1984 |
| JP | 55053153 A | | 4/1980 |
| JP | 57-095141 | * | 6/1982 |
| JP | 60156240 A | * | 8/1985 |
| JP | 4033536 A | | 2/1992 |
| JP | 4038149 A | | 2/1992 |
| JP | 645 542 | * | 3/1995 |
| JP | 2001016835 A | | 1/2001 |

* cited by examiner

SELF-COOLING ELECTRIC MACHINE

FIELD OF THE INVENTION

The present invention relates to an electric machine, and more specifically, relates to a self-cooling electric machine.

BACKGROUND OF THE INVENTION

Electric machines typically generate heat during operation due to the electromagnet forces required for their operation. However, electric machines such as electric motors, electric generators, and dynamoelectric machines, are often substantially enclosed, thereby limiting the ability to dissipate heat. This can cause the electric machine to operate at an elevated temperature. Generally, operating the electric machine at an elevated temperature reduces the efficiency of the electric machine, reduces the life of the electric machine, and increases the cost of the electric machine components as they must be designed from higher heat tolerant materials. Conventional methods of producing or enhancing airflow through the electric machine often result in increased manufacturing operations and increased costs.

SUMMARY OF THE INVENTION

The inventors of the present invention have invented an electric machine with improved air flow for self cooling the electric machine during operation.

According to one aspect of the invention, a rotor coupling for an electric machine with the rotor coupling has a first portion for attaching the rotor coupling to a rotor, and a second portion for attaching the rotor coupling to a shaft. An air disturber is positioned between the first portion and the second portion and extends into an unobstructed space defined by the first portion and the second portion.

According to another aspect of the invention, an electric machine includes a rotor that defines a cavity and includes at least one ventilation port. A rotor coupling has a first portion for attaching the rotor coupling to the rotor, and a second portion for attaching the rotor coupling to a shaft. The first portion and the second portion define an unobstructed space. The rotor coupling also has one or more air disturbers positioned between the first portion and the second portion. The air disturbers extend into the unobstructed space and the cavity.

According to still another aspect of the invention, a motor includes a shaft, an inner stator, an outer rotor having at least one ventilation port, and a rotor coupling. The rotor coupling includes a means for generating an airflow through the ventilation port. The means for generating the airflow includes a portion extending substantially free into an unobstructed space defined by the rotor coupling.

Further aspects of the present invention will be in part apparent and in part pointed out in the detailed description provided hereinafter. It should be understood that the detailed description and specific examples, while indicating some preferred embodiments of the invention, are intended for purposes of illustration only and are not intended to limit the scope of the invention.

BRIEF DESCRIPTION OF THE DRAWINGS

The present invention will become more fully understood from the detailed description and the accompanying drawings. The drawings represent only some of the exemplary embodiments of the invention, as other embodiments are also within the scope of the invention.

Corresponding reference characters indicate corresponding parts or elements throughout the several views of the drawings. The following description is merely exemplary in nature and is not intended to limit the invention, its applications, or uses.

DETAILED DESCRIPTION OF EXEMPLARY EMBODIMENTS

A rotor coupling, according to one embodiment of the invention, includes a first portion for attaching the rotor coupling to a rotor and a second portion for attaching the rotor coupling to a shaft. An air disturber is positioned between the first portion and the second portion and extends into an unobstructed space defined by the first portion and the second portion. Rotor couplings, according to several exemplary embodiments of the invention, are illustrated in FIGS. 2A, 2B, 2C, and 2D.

Figure 2:
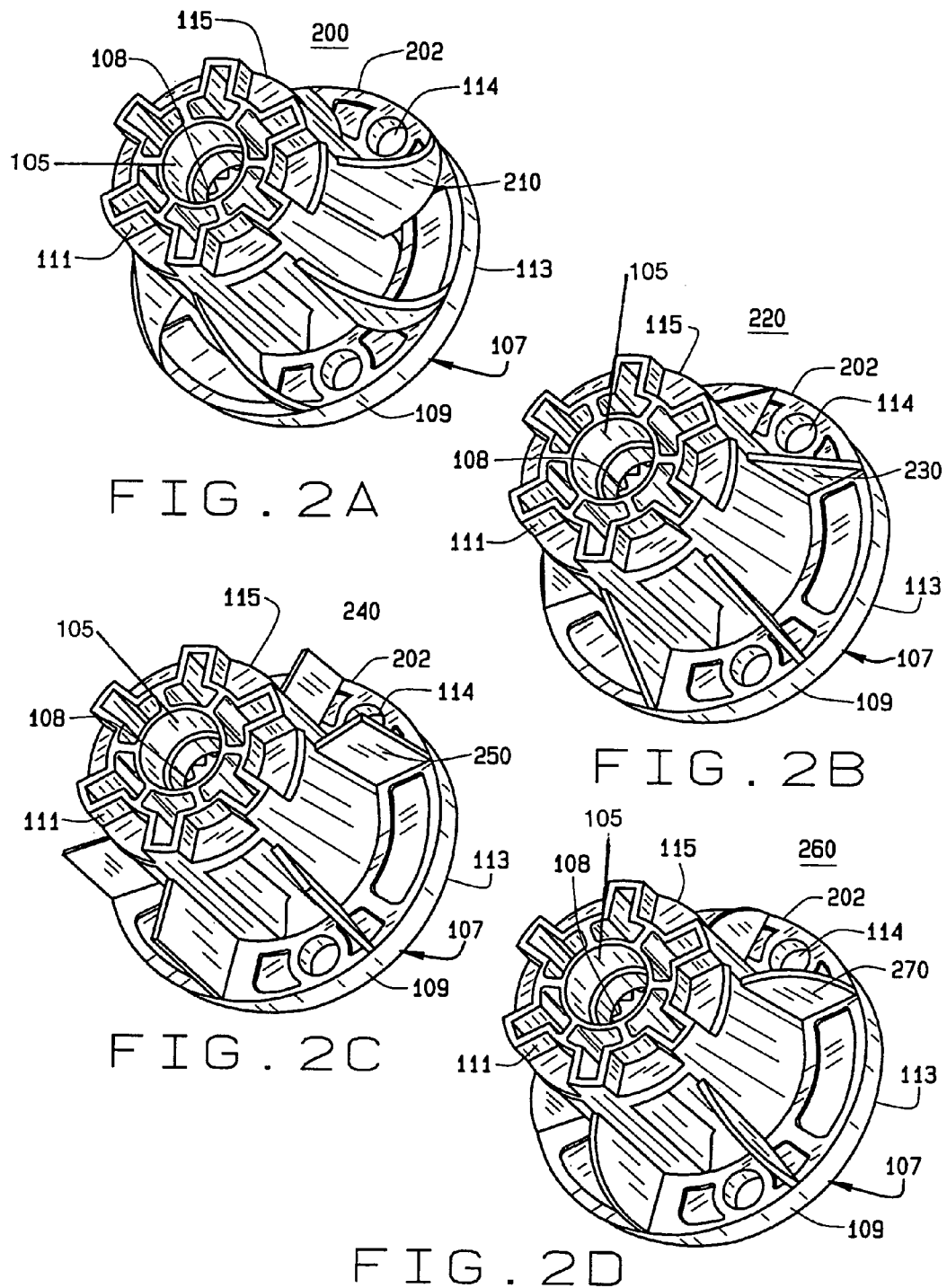
FIGS. 2A, 2B, 2C, and 2D are top views of rotor couplings with four air disturber configurations according to four exemplary embodiments of the invention.

As illustrated in FIG. 2A, a rotor coupling 200 includes a first portion 109, a second portion 111, and a plurality of air disturbers 210. The first portion 109 and the second portion 111 are positioned relative to each other to define an unobstructed space there between. The unobstructed space being a space having no other structure. The first portion 109 has a first portion perimeter 113 that generally defines the perimeter of the rotor coupling 200. An attachment surface 107 provides for attaching the rotor coupling 200 to a rotor (not shown). To assist in this attachment, the first portion 109 has one or more attachment holes or elements 114 that enable the insertion or engagement of a mounting fastener such as a screw or bolt (not shown). In other embodiments, the first portion 109 may be configured to mount to the rotor by any other fastening or mechanical coupling mechanism including, by way of example, gluing, bonding, welding, crimping, tabs, etc.

The second portion 111 configured for attaching the rotor coupling 200 to a shaft (not shown) of the electric machine. The second portion 111 includes a shaft hole 105 that includes one or more elements for attaching the rotor coupling 200 to the shaft such that the rotor coupling 200 rotates with the rotation of the shaft. As shown, the second portion 111 includes an exemplary shaft attachment element 108, a knurled inner portion. Other shaft attachment elements 108 or methods can include, by way of example, a press fitting, a key, a slot, a spline, and a bonding.

As illustrated, the air disturbers 210 are positioned between the first portion 109 and the second portion 111 and extend into the unobstructed space defined by the first portion 109 and the second portion 111. In other words, the air disturbers 210 extend freely above the first portion 109 and beyond the perimeter 115 of the second portion 111. As positioned, the air disturbers 210 engage air surrounding the rotor coupling 200 during the rotation of the rotor coupling 200 thereby providing a cooling air flow about the rotor coupling 200 and within the rotor attached to the rotor coupling 200.

There can be a single air disturber 210. In one preferred embodiment, there is an odd plurality of the air disturbers 210.

The air disturbers 210 may be of a wide variety of shapes and sizes. As illustrated in FIG. 2A, each of the air disturbers 210 has a concave-curved triangular shape extending from a mid-point of the perimeter 115 of the second portion 111 to about the perimeter 113 of the first portion 109. In other embodiments, the air disturbers 210 can be attached at a higher or lower point of the second portion 111 and may be attached to the first portion 109 that is at a mid-point away from the perimeter 113. In one preferred embodiment, the air disturbers 210 extend substantially above the first portion 109 but have less height than the second portion 111. In some embodiments, one or more of the air disturbers 210 is attached or physically coupled to only one of the first portion 109 and the second portion 111.

In other embodiments, the air disturbers 210 can have different shapes and sizes. For example, as illustrated in FIG. 2B, a rotor coupling 220 has a plurality of air disturber 230 having a substantially flat triangular shape. In another embodiment, one of the three edges of the substantially flat triangular shape edges of the air disturber 230 can be a convex or concave curve. A rotor coupling 240, as illustrated in the embodiment of FIG. 2C, has a plurality of air disturbers 250 having a rectangular shape. In another exemplary embodiment, a rotor coupling 260 of FIG. 2D has a plurality of air disturbers 270 with a curved or quarter-circle shape. While each of these exemplary embodiments illustrate the air disturbers 210 extending to about the perimeter 113 of the first portion 109, in other embodiments the air disturbers 210 may extend outward from the perimeter 115 of the second portion 111 only a portion of the distance to the perimeter 113 of the first portion 109. In these various embodiments, the air disturbers 210 extend into a free or unobstructed space defined by the first portion 109 and the second portion 111 to generate a cooling air flow about the rotor coupling 200 during rotation of the rotor coupling 200.

The rotor coupling such as the exemplary rotor couplings 200, 220, 240, 260, can be of any material, including, by way of example, a plastic, a silicon, a ceramic, a powdered metal, or a composite material formed into a rotor coupling during a molding process. In other embodiments, the rotor coupling 200, 220, 240, or 260 may be machined from a metal.

In addition to providing for a cooling airflow, in some embodiments, the air disturbers 210, 230, 250, and 270 may also provide for improved structure strength to the rotor coupling 200 by providing structure between the first portion 109 and the second portion 111.

Figure 1:
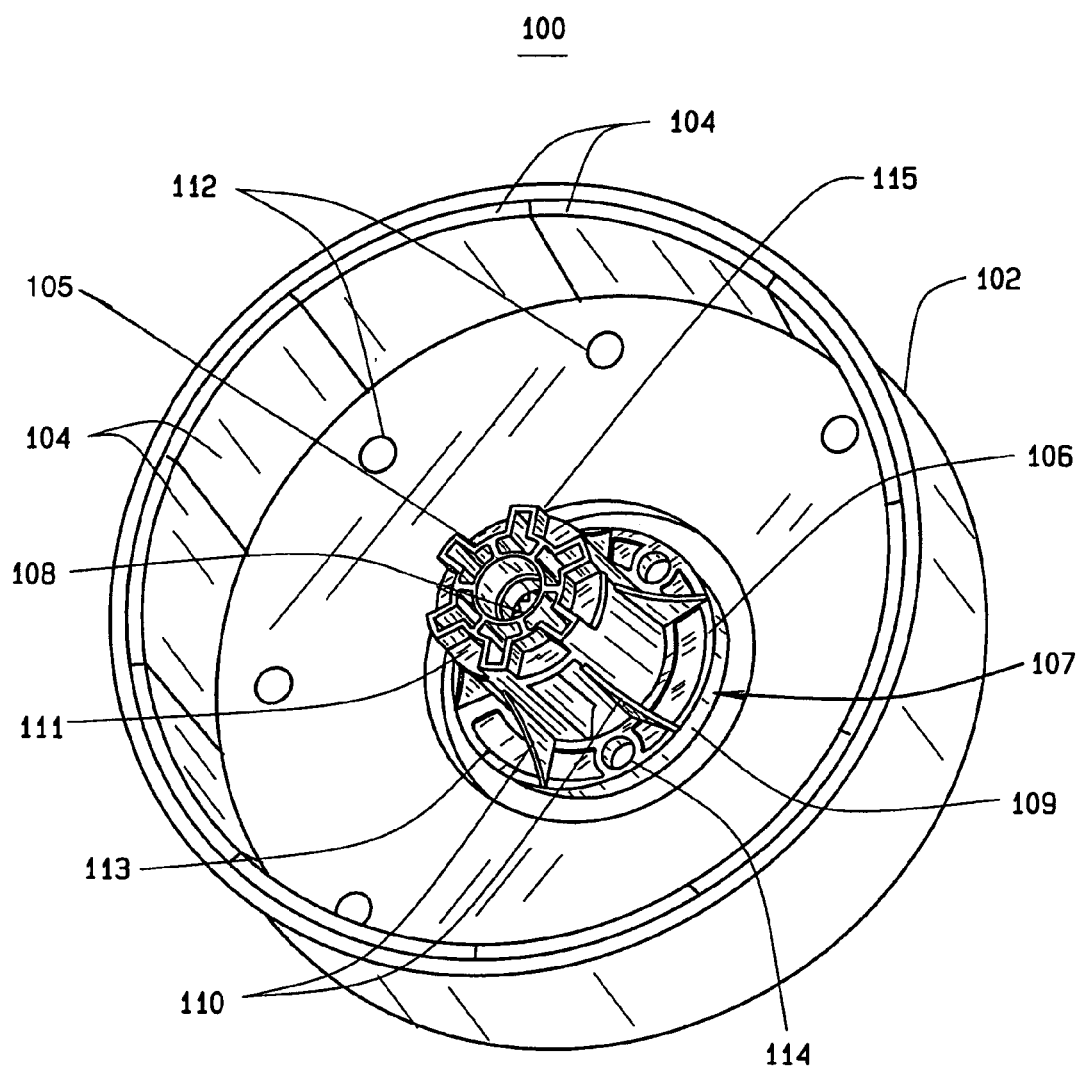
FIG. 1 is a perspective view of a rotor and a rotor coupling according to one embodiment of the invention.

Another embodiment of the invention includes a rotor and a rotor coupling as illustrated, by way of example, in FIG. 1. Rotor and rotor coupling assembly 100 includes a rotor 102 with one or more ventilation ports 112, and a rotor coupling 106 with one or more air disturbers 110. The first portion 109 and second portion 111 define the free space or unobstructed space where there is no other structure extending or present. The rotor coupling 106 includes the first portion 109 configured for attaching to the rotor 102. As shown, the rotor coupling attachment holes 114 provide for coupling the rotor coupling 109 to the rotor 102 on the rotor attachment surface 107 of the first portion 109. The first portion 109 includes a first portion perimeter 113 that defines the perimeter 107 of the rotor coupling 106. The second portion 111 includes the shaft hole 105 and at least one shaft attachment element 108 and can take the form of a hub for the rotor 102, as illustrated in FIG. 1. The rotor coupling 106 can also include a shaft attachment element 108 such as a shaft cavity or hole. The shaft attachment element 108 can be a shaft hole 105 having a knurl (as illustrated), spline portion, or slot or key for engagement of the rotor coupling 106 to a shaft (not shown). Other shaft attachment elements 108 or methods can also be utilized such as, by way of example, gluing or bonding.

The air disturbers 110 are positioned between the first portion 109 and the second portion 111 and extend into the unobstructed space such that airflow is generated during rotation of the rotor 102 and coupled rotor coupling 109. While the air disturbers 110 are illustrated in FIG. 1 as having a substantially flat three-sided shape with an outer side having a concave curve, as discussed above with regard to other exemplary shapes of FIG. 2A-2D, the air disturbers 110 can have a variety of different shapes. Additionally, the air disturbers 110 can be attached or coupled to one or both of the first portion 109 and the second portion 111 is a variety of manners and variety of points of attachment.

The air disturber 110 can be aligned, at least in part, along a radius extending perpendicular to the axis defined by the second portion 111. The air disturber 110 can be structurally coupled to one or both of the first portion 109 or the second portion 111 of the rotor coupling 106. In other embodiments, the air disturber 110 is structurally coupled to the first portion 109 near the rotor coupling perimeter 115 or may be attached in a mid-point between the perimeter 115 of the second portion and the perimeter 113 of the first portion.

As discussed above, the air disturber 110 can be of any shape and in one embodiment one or more of a plurality of air disturber 110 has the same shape. In another embodiment, one or more air disturbers 110 have a different shape. Also, as discussed above, the shape of each air disturber 110 can be a triangular shape, a box shape, a square shape, a rectangular shape, a curved shape, a quarter-circle shape, or a three-sided shape having one side with a curve. Additionally, one or more of the air disturbers 110 can include a curved portion, such as a portion or section that is convex or concave relative to the outer perimeter of the rotor coupling 106.

In one embodiment, the rotor coupling 106 has only a single air disturber 110. In another embodiment, an odd plurality of air disturbers 110 are positioned between the first portion 109 and the second portion 111.

The exemplary rotor 102 of FIG. 1 includes an outer perimeter and an outer radial surface that substantially forms and encloses a rotor cavity. An opening is configured to accept a stator (not shown). A plurality of magnets 104 is attached to an inner surface of the rotor 102. The magnets 104 can be permanent magnets or electromagnets. The magnets 104 can be flexible or formed to conform to the inner surface of the outer rotor 102 and can be attached by any available attachment means such as gluing or bonding. The magnets 104 are generally configured to align with one or more poles of the stator (not shown) when the stator is positioned within the rotor cavity.

As noted, the rotor 102 includes one or more ventilation ports 112 that, in this exemplary embodiment, are formed in the outer radial surface of the rotor 102. The ventilation port 112 can be formed by any means such as, for example, drilling, punching, or molding. The ventilation port 112 can be of any size selected at least in part with consideration of the function of the geometry and dimensions of the rotor 102 and a stator (not shown) and the air flow produced by the air disturbers 110. The ventilation port 112 can be positioned at any location on the outer radial surface as a function of the geometry and dimension of the rotor 102 and the inner stator. In one preferred embodiment, a plurality of ventilation ports 112 are positioned on an exterior portion of the outer radial surface to provide an air path for the cooling airflow generated by the air disturbers 110 of the rotor coupling 106.

In one embodiment, a plurality of attachment holes 114 is configured to receive a screw, bolt, or other fastener (not shown) to structurally attach the rotor coupling 106 to the rotor 102. In other embodiments, the rotor coupling 106 may be coupled to the rotor 102 by gluing or bonding. In another embodiment, the rotor coupling 106 is an integral component or is a monolithic unit with the rotor 102. As such, in some embodiments, a rotor coupling attachment element or hole 114 is not included or required.

Figure 3:
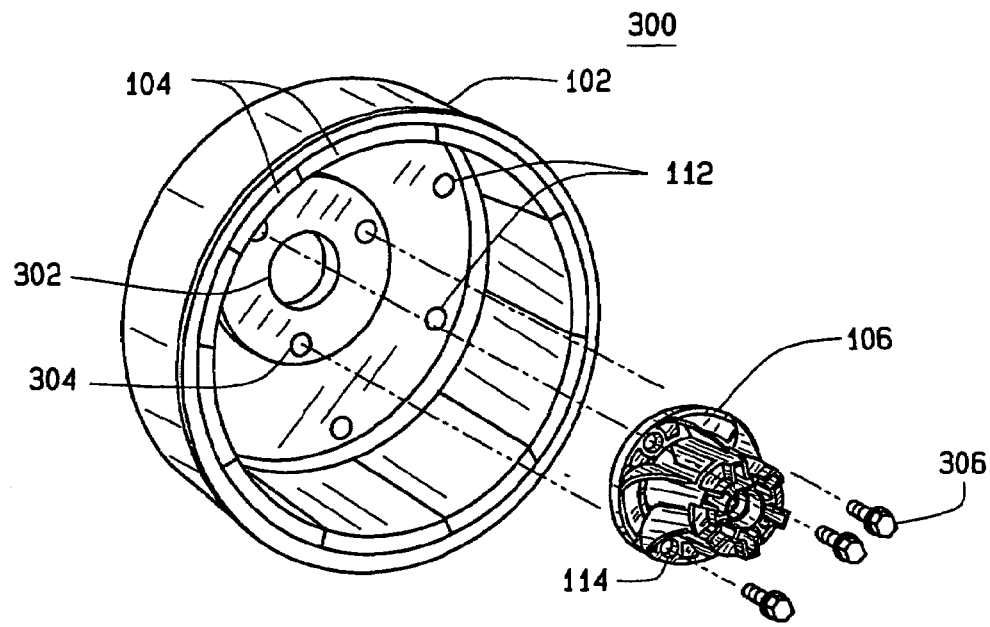
FIG. 3 is an exploded view of a rotor and a rotor coupling assembly according to still another embodiment of the invention.

FIG. 3 illustrates an exploded view of a rotor assembly 300 having the rotor 102 and the rotor coupling 106 according to one embodiment of the invention. The rotor 102 includes a shaft hole 302 for receiving a shaft (not shown) and a plurality of rotor attachment holes 304 for engagement of a rotor coupling attachment bolt 306 when inserted in the rotor coupling attachment hole 114. The rotor attachment hole 304 can be a threaded hole machined into the rotor 102 or through a hole for accepting bolt to engage a nut (not shown). When rotor coupling 106 is coupled to the rotor 102, the ventilation ports 112 remain clear of any obstruction thereby providing a port or channel for the airflow generated by the rotor coupling 106 having one or more air disturbers.

Figure 5:
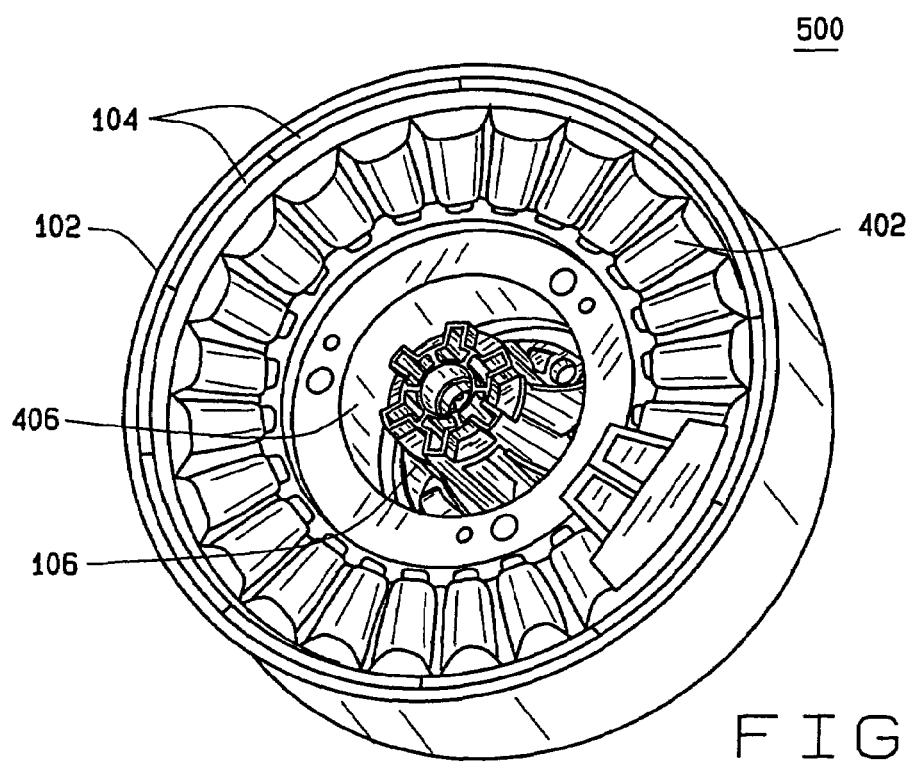
FIG. 5 is an isometric view of an electric machine according to another embodiment of the invention.
Figure 4:
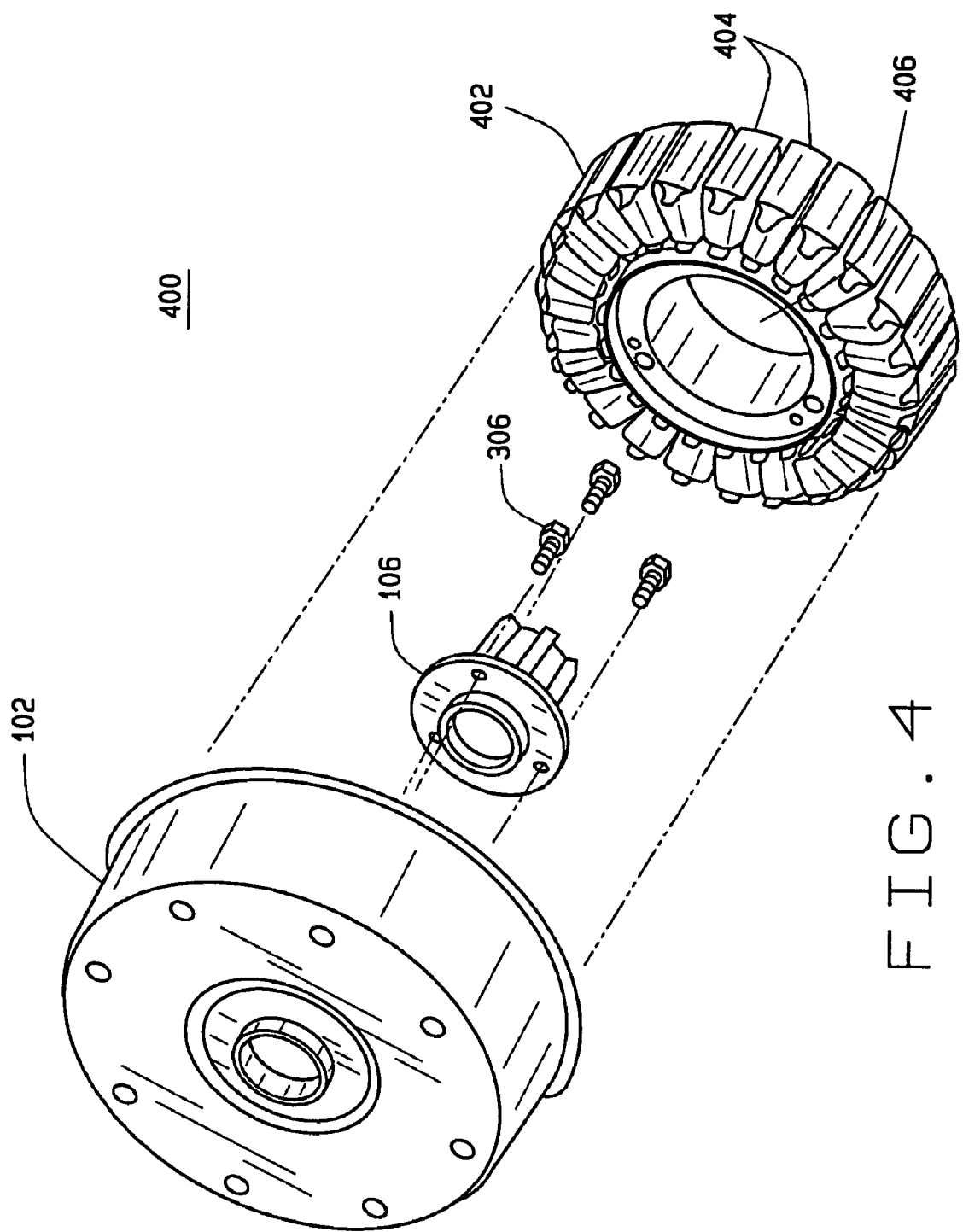
FIG. 4 is an exploded view of a rotor, rotor coupling, and stator according to yet another embodiment of the invention.

Further embodiments of the invention are illustrated in FIG. 4 and FIG. 5, by an exploded view of an electric machine assembly 400 in FIG. 4 and an assembled view of an electric machine assembly 500 in FIG. 5. An inner stator 402 includes a plurality of stator poles 404. The stator poles 404 can be electromagnet poles formed by wire windings energized by an external energy source or can be permanent magnets. The stator 402 can also include an inner stator cavity 406. The stator cavity 406 is dimensioned to accept the rotor coupling 106 and enable its free rotation. The stator cavity 406 is dimensioned to enable air flow generated by the air disturbers 110 of the rotor coupling 106. The stator 402 is configured for positioning within the rotor cavity as illustrated in FIG. 5 and magnetic coupling of the stator poles 404 with the rotor magnets 104.

Figure 6:
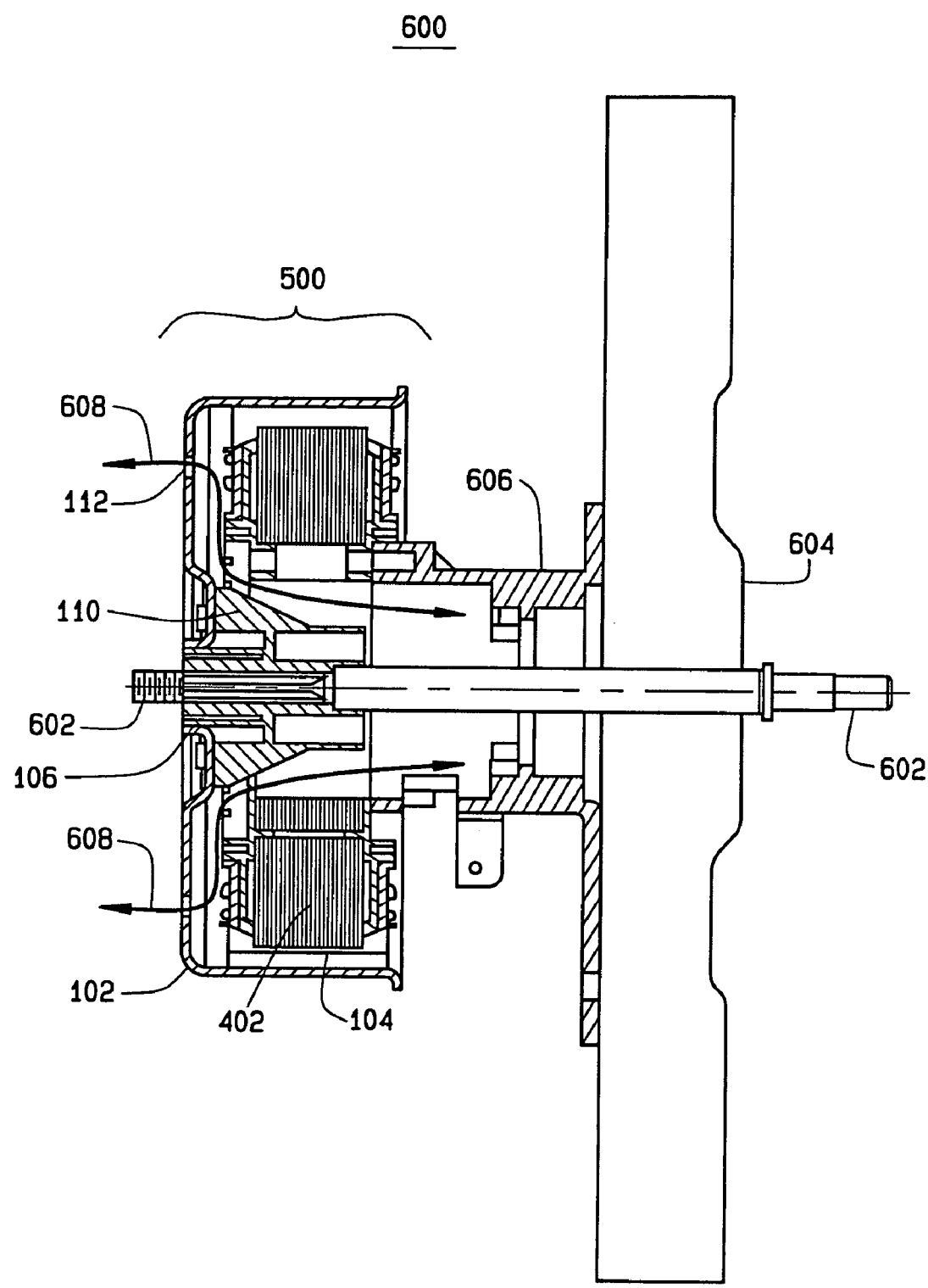
FIG. 6 is a sectional view of an electric machine according to another embodiment of the invention.

Referring now to FIG. 6, an electric machine assembly 600 according to one embodiment of the invention is illustrated. The electric machine assembly 600 includes the rotor and stator assembly 500 of FIG. 5. As illustrated, an electric machine application 604 can be an appliance application such as, by way of example, a clothes washing machine tub or a fan housing. A shaft 602 is coupled through the electric machine application 604 for use in the user application to provide rotational force or energy. The rotor and stator assembly 500 is mounted to the electric machine application 604 by an electric machine mount 606 that provides structural attachment to the electric machine application 604. The rotor 102 includes the magnets 104 on an inner surface of the perimeter of the rotor 102. The rotor coupling 106 with the air disturbers 110 is coupled to the shaft 602 via a knurl or spline attachment element (not shown). The rotor 102 is attached to the rotor coupling 106. The stator 402 is positioned within a cavity of the rotor 102 and about the rotor coupling 106. The stator 402 is also attached to the electric machine mount 606.

In operation, the stator poles 404 are energized on a selective basis and magnetically interact with the rotor magnets 104. A rotational force or energy rotates the rotor 102 about the shaft 602. During rotation of the rotor 102, the air disturbers 110 of the rotor coupling 106 disturb the air within the inner cavity of the rotor 102. The air disturbers 110 create airflow through the ventilation ports 112 with the air flow direction being dependent on the direction of the rotation of the rotor 102, the geometry of the air disturbers 110 and the geometry of the rotor 102 and the stator 402. The disturbed air flow 608 flows through the ventilation ports 112 on the rotor 102 and through the center cavity of the rotor 102 and the stator 402. The disturbed air flow 608 can also flow between two or more of the stator poles 404 during the rotation of the rotor 102. The disturbed air flow 608 includes ambient temperature or cooled air that flows through portions of the rotor and stator assembly 500, thereby dissipating heat formed during the electromagnetic operation of the electric machine assembly 500 and particularly the stator poles 404.

Another embodiment of the invention includes a method of manufacturing an electric machine having an outer rotor and an inner stator. The outer rotor is configured for rotation about a fixed stator during operation of the electric machine. The method of manufacturing includes forming the outer rotor with a rotor cavity defining one or more ventilation ports. The rotor can be formed from any manufacturing process including stamping, molding, or machining. The ventilation port can also be formed by any manufacturing method including stamping, machining, drilling, or molding. The method also includes forming or molding a rotor coupling to include one or more air disturbers. The rotor coupling can be formed from a metal, a plastic, a composite, or any other viable material. In one preferred embodiment, the rotor is molded from a plastic or composite material.

In another embodiment, an outer rotor can be formed to include an enclosed perimeter and a substantially enclosed outer radial surface. In one embodiment, the rotor is shaped as a traditional pie pan where the opening enables the placement of a stator within the cavity of the rotor. The ventilation port or ports can be located on any portion of the substantially enclosed outer radial surface in any pattern or formed in any manner. In one preferred embodiment, a plurality of ventilation ports are formed on a perimeter of the substantially enclosed outer radial surface. The position of the ventilation port or ports can be altered based on the geometry, features and dimensions of the rotor, the stator and the combination of the two. In a preferred embodiment, the ventilation holes are positioned to maximize the air flow created by the air disturber of the rotor coupling.

As discussed above, the rotor coupling can be molded or formed to include one or more types of attachment elements for attaching the rotor coupling to the rotor. These can include holes or slots for placements of an attachment device such as a fastener, screw, or bolt. In other embodiments, the attachment system can be a gluing or bonding system. In yet other embodiments, the rotor coupling can be formed as a single monolithic or common component with an outer rotor.

The rotor coupling can be formed to include one or more shaft engagement elements for engaging the rotor coupling to a shaft. The shaft engagement element can be a set of knurls or slots that engage an associated system on a shaft. Other engagement elements or methods may include a press fit system, a key system, a pin mechanism, or a glue or bonding mechanism. The method can also include coupling of the rotor to the shaft utilizing the selected rotor engagement system utilizing the rotor coupling.

The rotor can be formed to include an enclosed perimeter that forms a rotor cavity. One or more magnets, such as permanent magnets, can be attached in any manner including gluing and bonding to an inner surface of the enclosed perimeter. The magnets are positioned to form rotor poles that interact with the stator poles for providing rotational force for turning the rotor during operation of the electric machine.

One or more air disturbers can be molded or formed on the rotor coupling to produce airflow about an inner stator located within the rotor cavity and through the ventilation port during rotational operation of the rotor. An electric machine can be configured to enable ambient air to enter the rotor through one of a plurality of ventilation holes due to suction created by the air disturber. The air disturber draws in the air through the ventilation holes and around or through one or more portions of the stator. The air disturber forces the air to exit the electric machine around an opening of the electric machine or around the shaft of the electric machine.

Embodiments of the electric machine and rotor assembly having a rotor with a ventilation port and a rotor coupling with at least one air disturber provides for an improved airflow through the electric machine thereby providing for improved cooling of the electric machine. Additionally, embodiments of an electric machine can also provide for improved manufacturing and assembly of the electric machine having improved cooling by eliminating manufacturing processes.

When introducing aspects of the invention or embodiments thereof, the articles "a", "an", "the", and "said" are intended to mean that there are one or more of the elements. The terms "comprising", "including", and "having" are intended to be inclusive and mean that there can be additional elements other than the listed elements.

In view of the above, it will be seen that several advantages are achieved and other advantageous results attained by one or more embodiments of the invention. As various changes could be made in the above exemplary constructions and methods without departing from the scope of the invention, it is intended that all matter contained in the above description or shown in the accompanying drawings shall be interpreted as illustrative and not in a limiting sense.

It is further to be understood that the steps described herein are not to be construed as necessarily requiring their performance in the particular order discussed or illustrated. It is also to be understood that additional or alternative steps can be employed.

What is claimed is:

1. A rotor coupling for an electric machine comprising a first portion, a second portion extending from the first portion, and an air disturber positioned between the first portion and the second portion and extending radially from the second portion into an unobstructed space defined by the first portion and the second portion to about a perimeter of the first portion, the first portion for attaching the rotor coupling to a rotor base such that substantially the entire rotor coupling and air disturber are positionable within an interior cavity of a stator, the second portion for attaching the rotor coupling to a shaft.

2. The rotor coupling of claim 1 wherein the air disturber is substantially free of any structure extending radially outward beyond the perimeter of the first portion.

3. The rotor coupling of claim 1 wherein the air disturber is structurally coupled to the first portion and the second portion and is substantially free from any other structure.

4. The rotor coupling of claim 1, further comprising an odd plurality of air disturbers.

5. The rotor coupling of claim 1 wherein the air disturber is substantially flat.

6. The rotor coupling of claim 1 wherein the air disturber is at least in part concave.

7. The rotor coupling of claim 1 wherein the air disturber has a triangular shape.

8. The rotor coupling of claim 1 wherein the air disturber has a three-sided shape including one curved side.

9. The rotor coupling of claim 1 wherein a height of the first portion is substantially less than a height of the second portion and a height of the air disturber.

10. The rotor coupling of claim 9 wherein the air disturber height is less than the height of the second portion.

11. An electric machine comprising a rotor defining a cavity and including at least one ventilation port within a base of the rotor, and a rotor coupling having a first portion, a second portion extending from the first portion, and at least one air disturber positioned between the first portion and the second portion and extending into an unobstructed space within the cavity defined by the first portion, and the second portion, the first portion for attaching the rotor coupling to the rotor base such that substantially the entire rotor coupling and the at least one air disturber are positionable within an interior cavity of a stator, the second portion for attaching the rotor coupling to a shaft.

12. The electric machine of claim 11 wherein the rotor coupling includes an odd plurality of air disturbers.

13. A motor comprising a shaft, an inner stator, an outer rotor having at least one ventilation port within a base of the rotor, and a rotor coupling having means for generating an airflow through the at least one ventilation port and defining an unobstructed space, said means for generating the airflow including at least a portion extending substantially free into the unobstructed space, the rotor coupling including a first portion for attaching the rotor coupling to the rotor and a second portion for attaching the rotor coupling to the shaft, the first portion and the second portion defining the unobstructed space, said means for generating an airflow positioned between the first portion and the second portion, the rotor coupling coupled to the rotor base such that substantially the entire rotor coupling is positioned within an interior of a stator.

14. The motor of claim 13 wherein said means for generating an airflow extends into an inner cavity of the inner stator.

15. The motor of claim 13 wherein the means for generating an airflow being structurally coupled to the first portion and the second portion and being substantially free from any other structure.

* * * * *